Patented Mar. 29, 1927.

1,622,690

UNITED STATES PATENT OFFICE.

HERMANN WAGNER, OF HOCHST-ON-THE-MAIN, GERMANY, ASSIGNOR TO I. G. FAR-BENINDUSTRIE AKTIENGESELLSCHAFT, OF FRANKFORT-ON-THE-MAIN, GERMANY.

MANUFACTURE OF AZO DYESTUFFS DERIVED FROM 2-HYDROXYNAPHTHALENE-3-CARBOXYLIC-ACID-ARYLAMIDES.

No Drawing.  Application filed March 17, 1922. Serial No. 544,613.  REISSUED

According to U. S. Patent No. 1,034,853 of Winter et al. granted August 6, 1912, dyestuffs of good properties are obtained by the combination of diazo-compounds with arylides of the 2.3-hydroxynaphthoic acid. Now it has been found, that dyestuffs of surprisingly favourable properties are obtained by the combination of diazo compounds derived from mononuclear aromatic amines with o-toluidides of 2.3-hydroxynaphthoic acid. The compounds containing halogen and among these the compounds containing halogen in both components are distinguished by their excellent fastness properties.

The new azo dyestuffs are represented by the general formula

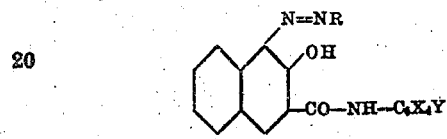

wherein R may be any mononuclear aromatic residue, X may be hydrogen, halogen or any substituent, and Y is a methyl group in ortho position to the nitrogen. Upon reduction with stannous chlorid and hydrochloric acid an aromatic amine and a toluidide of 1-amino-2-hydroxy-3-naphthoic acid are produced.

An advantage of these dyestuffs as compared with the anilido and nitranilido compounds of 2.3-hydroxynaphthoic acid as well as with the compounds cited in great number in the U. S. Patent No. 1,034,853 consists in that they have a great kier-boiling and a much better discharge ability so that a remarkably good white is obtainable. Moreover, the new dyestuffs possess a very pure shade. As compared with the compounds of other toluidides of 2.3-hydroxynaphthoic acid, those of the o-toluidides show besides other at least equally good properties in numerous cases a better fastness to light. But the special importance of this invention resides in the discovery of a field of use for o-toluidine and o-nitrotoluene respectively. This substance is formed, as it is known, as the chief product by nitrating toluene. For the homologues occurring in small quantity especially p-nitrotoluene great domains of utilization are known already, whereas for the chief substance, the o-nitrotoluene, there has been only a small demand so that it presented a disagreeable waste-product in the chemical industry. Therefore, the discovery of a group of dyestuffs, having such excellent fastness properties and at the same time providing a use for this product, is of very great importance.

Examples.

1. The material is padded with a solution of: 20 g. 2.3-hydroxynaphthoic acid-o-toluidid, 60 g. caustic soda solution of 22° Bé., 20 g. para soap PN, made up to 1 liter.

Then it is dried and printed with the following colour: 15.2 g. 6-nitro-2-toluidine, 200 cc. water, 24 cc. hydrochloric acid of 22° Bé., mix well to a paste, cool with 150 g. ice, then add 8 g. sodium nitrite dissolved in 50 g. water, 550 g. tragacanth (60:1000) and to this are added before using: 20 g. sodium acetate; total, 1 kg.

The dyestuff has the following structural formula:

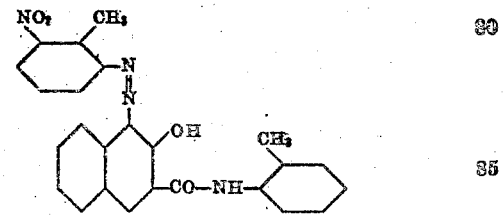

2. The material is padded with a solution of: 20 g. 2.3-hydroxynaphthoic acid-o-toluidid, 60 g. caustic soda solution of 22° Bé., 20 g. para soap PN, made up to 1 liter.

Then it is dried and printed with the following colour: 12.7 g. p-chlor-anilin, 200 g. water, 24 cc. hydrochloric acid of 22° Bé., mix well to a paste, cool with 150 g. ice, then add 8 g. sodium nitrite dissolved in 50 g. water, 550 g. tragacanth (60:1000) and to this are added before using: 20 g. sodium acetate; total, 1 kg.

The dyestuff has the following structural formula:

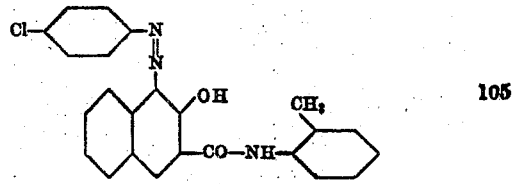

3. The material is padded with a solution of: 20 g. 2.3-hydroxynaphthoic acid-4-chlor-o-toluidid (CH₃:NH:Cl=1:2:4), 65 g. caustic soda solution of 22° Bé., 20 g. sodium ricinolate, made up to 1 liter.

Then it is dried and printed with the following colour: 16.8 g. 4 nitro-o-anisidin are dissolved with 80 cc. hydrochloric acid of 22° Bé. and 200 cc. boiling water, well cooled and then added 150 g. ice. To this is added while stirring 7.2 g. sodium nitrite dissolved in 50 cc. water. The solution is made up with water to 500 g.

This diazo-solution is mixed with 480 g. tragacanth (60:1000) and to this are added before using: 20 g. sodium acetate crystallized; total, 1 kg.

Thus is obtained a very bright-red on the fibre of very good fastness properties.

The dyestuff has the following structural formula:

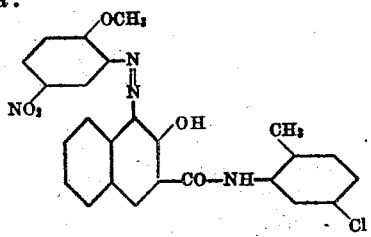

4. The material is padded with a solution of: 27 g. 2.3-hydroxynaphthoic acid-4-brom-o-toluidid, 60 g. caustic soda solution of 22° Bé., 20 g. para soap PN, made up to 1 liter.

Then it is dried and printed with the following colour: 15.7 g. p-chloranisidin, 200 g. water, 24 cc. hydrochloric acid of 22° Bé., mix well to a paste, cool with 150 g. ice, then add 8 g. sodium nitrite dissolved in 50 g. water, 550 g. tragacanth (60:1000) and to this are added before using: 20 g. sodium acetate; total, 1 kg.

The dyestuff has the following structural formula:

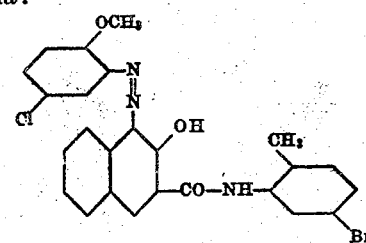

5. Padding liquor: 23 g. 2.3-hydroxynaphthoic acid-5-chlor-o-toluidid, 60 g. caustic soda solution 22° Bé., boiling water, 20 g. para soap PN, to 1 liter.

Printing paste: 17.5 g. 4-chlor-3-toluidine hydrochloride, 200 g. water, 16 g. hydrochloric acid of 22° Bé., dissolve, cool with 150 cc. ice, then add 7 g. sodium nitrite dissolved in 50 g. water, 540 g. tragacanth (60:1000) and before use add 20 g. sodium acetate; total, 1 kg.

The dyestuff has the following structural formula:

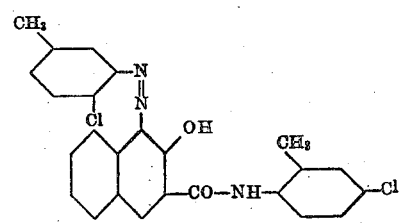

Instead of 17.5 g. 4-chlor-3-toluidine the same quantity of 4-chlor-o-toluidine for instance can be used.

6. The yarn is prepared with the following solution: 12.7 g. beta-hydroxynaphthoic acid-o-toluidid, 20 cc. caustic soda solution of 34° Bé., 30 cc. sodium Turkey red oil 50%, 500 cc. hot water, with cold water made up to 1 liter.

The printed yarn is wrung and dyed with the following diazo-compound: 17.5 g. 4-chlor-o-toluidine hydrochloride are dissolved with 16 cc. hydrochloric acid 22° Bé. and 200 cc. boiling water, then cooled while adding 150 g. ice. To this is added a solution of 7.2 g. nitrite in 50 cc. water while stirring. The solution is made up to 4 liter and to this added 20 g. sodium acetate before use.

After dyeing it is well wrung, rinsed and soaped. Thus is obtained a very bright red of excellent fastness properties.

The dyestuff has the following structural formula:

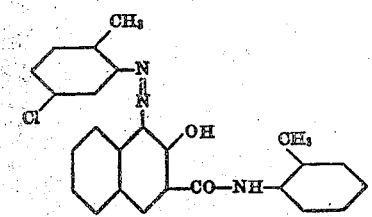

7. The diazo-compound obtained from 14.1 g. chlor-o-toluidine in the usual manner is poured in an aqueous suspension of 29 g. 2.3-hydroxynaphthoic acid-o-toluidid prepared by dissolving it in caustic soda solution and again precipitating it with diluted acetic acid. The dyestuff separates in bluish-red flakes; then is filtered, washed and dried.

The dyestuff has the following structural formula:

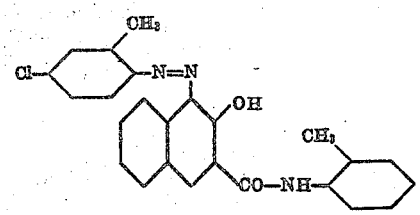

Having now described my invention what I claim is:

1. As new products the azo dyestuffs of the general formula:

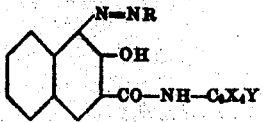

wherein R may be any mononuclear aromatic residue, X may be hydrogen, halogen or any substituent, Y is a methyl group in ortho position to the nitrogen.

2. As a new product, the azo dyestuffs which can be obtained by the combination of any diazo compounds derived from mononuclear aromatic amines with o-toluidides of the 2.3-hydroxynaphthoic acid and which lead by reduction with stannous chloride and hydrochloric acid to an aromatic amine and to a toluidide of the 1-amino-2-hydroxy-3-naphthoic acid.

In testimony whereof, I affix my signature.

HERMANN WAGNER.